United States Patent
Zhang

(10) Patent No.: US 8,730,793 B2
(45) Date of Patent: May 20, 2014

(54) METHOD AND APPARATUS PROVIDING NETWORK REDUNDANCY AND HIGH AVAILABILITY TO REMOTE NETWORK NODES

(75) Inventor: Debin Zhang, Littleton, MA (US)

(73) Assignee: Avaya Inc., Basking Ridge, NJ (US)

(*) Notice: Subject to any disclaimer, the term of this patent is extended or adjusted under 35 U.S.C. 154(b) by 99 days.

(21) Appl. No.: 13/422,383

(22) Filed: Mar. 16, 2012

(65) Prior Publication Data

US 2013/0242718 A1 Sep. 19, 2013

(51) Int. Cl.
*H04J 1/00* (2006.01)

(52) U.S. Cl.
USPC .......................................... 370/218

(58) Field of Classification Search
USPC .............. 370/216–221, 225–227, 237, 351, 370/386–392, 395.5–395.52; 709/208–209, 709/217, 220, 223, 238
See application file for complete search history.

(56) References Cited

U.S. PATENT DOCUMENTS

| | | | | |
|---|---|---|---|---|
| 6,496,502 B1 * | 12/2002 | Fite et al. | ...................... | 370/389 |
| 6,651,117 B1 | 11/2003 | Wilson et al. | | |
| 6,731,599 B1 * | 5/2004 | Hunter et al. | .................. | 370/229 |
| 6,738,821 B1 | 5/2004 | Wilson et al. | | |
| 7,260,097 B2 * | 8/2007 | Casey | ........................... | 370/392 |
| 7,269,132 B1 * | 9/2007 | Casey et al. | ................... | 370/219 |
| 7,463,579 B2 * | 12/2008 | Lapuh et al. | ................... | 370/216 |
| 7,616,625 B1 | 11/2009 | Un et al. | | |
| 2010/0189106 A1 * | 7/2010 | Azimi et al. | .................. | 370/390 |
| 2012/0106320 A1 * | 5/2012 | Moisiadis et al. | ............ | 370/217 |
| 2012/0110393 A1 * | 5/2012 | Shieh et al. | ..................... | 714/48 |

OTHER PUBLICATIONS

European Search Report from corresponding EP Application 12185770.0 dated Jan. 16, 2013, pp. 1-5.

* cited by examiner

*Primary Examiner* — Frank Duong
(74) *Attorney, Agent, or Firm* — Anderson Gorecki & Rouille LLP

(57) ABSTRACT

A method, apparatus and computer program product is presented. A first tunnel is provided across a layer 3 network from a first network device to a second network device. A first virtual interface (VI) is provided on the second network device, and assigned to the first tunnel. Information related to the first tunnel and the first VI is passed to a third network device, which is a member of a cluster with the second network device. A second tunnel is provided across the layer 3 network from the third device to the first network device, and a second virtual interface (VI) is provided on the third network device, and assigned to the second tunnel. Forwarding information is exchanged between the second network device and the third network device. The second network device and the third network device provide forwarding redundancy service to the first network device.

20 Claims, 9 Drawing Sheets

METHOD AND APPARATUS PROVIDING NETWORK REDUNDANCY AND HIGH AVAILABILITY TO REMOTE NETWORK NODES

BACKGROUND

Data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, tablets and other types of consumer electronics connect to and transmit/receive data over the communication network and, hence, are users of the communication services offered by the communication network.

Network elements (e.g. Access Points, Mobility Switches and Edge Switches) are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. The packets are transferred across the network in accordance with a particular protocol, such as the Internet Protocol (IP).

Ports can fail for many reasons, including line card failure, failure of the link connected to the port (e.g. line cut), far-end line card failure, etc. Likewise, the internal forwarding datapath within the network element may fail which may cause a port or set of ports to appear to have failed, or there may be some other failures along the logical/virtual connection to the port's external peer endpoint. There are numerous reasons why a port may fail.

In the event a port fails, traffic flowing through the port should be diverted to flow out an alternate port to enable connectivity to be restored through the network. To minimize impact on the traffic being handled by the network element, e.g. to minimize downtime and packet loss, the quicker the rerouting of traffic can occur the better.

Over time, the manner in which network elements handle data has evolved. For example, two or more physical links may extend between a group of network elements and be used collectively as a multi-link trunk (MLT). When the links of an MLT are physically connected to two different network elements, the MLT is referred to as a Split Multi-Link Trunk (SMLT). In particular, each of the links in the MLT may be used by either of the network elements to forward data to the other. Thus, if a first network element has data (e.g., a frame/packet) to send to a second network element, the first network element may select one of the links from the MLT and transmit the packet over that link to the second network element.

As noted above, depending on the manner in which the network elements are interconnected, there may be many ways for the network element to forward a frame/packet to enable the frame/packet to reach its destination. As used herein, the term "cluster" is used to refer to one or more nodes providing node-level resiliency at the network level. Logical connections between the cluster nodes are referred to herein as Inter-Switch Trunks (ISTs). ISTs may be physical links that extend from one network element to a neighboring network element in the cluster, or may be logical links that tunnel through one or more intermediate network elements within the cluster. The node that receives a packet will be referred to as a local node. All other nodes within the cluster are referred to as remote nodes with respect to the received packet.

When a logical port is implemented as a MLT or SMLT, there are actually multiple physical ports that are capable of forwarding a packet to its next hop on the network. Accordingly, if one of the ports of a MLT/SMLT fails, it would be advantageous to cause the packet to be forwarded on one of the remaining ports so that the packet can traverse the network rather than being dropped In order to achieve low operation cost and easy maintenance, virtualization technology has been widely used in modern communication network. With the help of virtualization and the technologies built on top of it, such as Multi Protocol Label Switching (MPLS), Virtual Private Network (VPN) Lite, and Provider Link State Bridging (PLSB), multiple users can share a common core network without interfering with each other. All these technologies allow users to extend their private network across shared common core network or layer 3 network. For such users, providing network redundancy and high availability to remote network nodes across a layer 3 network becomes a crucial requirement.

SUMMARY

In a world where communications and permanent connectivity of devices to the Internet have become the norm, loss of connectivity is becoming unacceptable. This requires networks to provide as fast recovery as possible and as small traffic loss as can possibly be allowed.

SMLT/RSMLT is a widely deployed network topology, which provides network redundancy and high availability by letting two network forwarding devices forming SMLT/RSMLT peers. From other network equipments' perspective, SMLT/RSMLT peers work as a single network entity. By exchanging forwarding information and running status, SMLT/RSMLT peers back up each other. If one of them goes down, its peer will take over its responsibility, so that continuous forwarding functionality will be provided. Another important benefit of SMLT/RSMLT is that it offers load balancing between SMLT/RSMLT peers.

Conventional mechanisms such as those explained above suffer from a variety of deficiencies. One such deficiency is that existing SMLT/RSMLT technology limits the SMLT/RSMLT connection to physical level. To be more specific, the SMLT/RSMLT links have to be physical interfaces. Network events, such as SMLT/RSMLT link up/down that trigger SMLT/RSMLT failover, all depends on the status change on physical link. Due to this restriction, SMLT/RSMLT can only be deployed at certain portion of network area, such as network edge or core and cannot be set up crossing network layer 3 networks.

With the rapid increase of network users and data volume, the size and complexity of network has grown dramatically. Existing SMLT/RSMLT technology cannot satisfy the network redundancy and high availability requirement in large scale network. Users need redundancy provided by remote network devices, to which their local network equipments do not have physical/direct connection. For this type of cases, existing SMLT/RSMLT technology cannot help. The presently described method and apparatus providing network redundancy and high availability to remote network nodes provides a method that extends existing SMLT/RSMLT technology across a layer 3 network, so that network redundancy can be provided to remote network devices, which do not have physical/direct connection to SMLT peers.

Embodiments of the invention significantly overcome such deficiencies and provide mechanisms and techniques that extends existing SMLT/RSMLT technology across a layer 3 network, so that network redundancy can be provided to remote network devices, which do not have physical/direct connection to SMLT peers.

In a particular embodiment of a method for providing network redundancy and high availability to remote network nodes, the method includes providing a first tunnel across a layer 3 network from a first network device to a second network device, the second network device a member of a cluster of network devices. The method further includes providing a first virtual interface (VI) on the second network device, the first VI assigned to the first tunnel and passing information related to the first tunnel and the first VI to a third network device, the third network device a member of the cluster. Additionally the method includes providing a second tunnel across a layer 3 network from the third device to the first network device and providing a second virtual interface (VI) on the third network device, the second VI assigned to the second tunnel. The method also includes exchanging forwarding information learned on the first VI to the third network device and exchanging forwarding information learned on the second VI to the second network device.

Other embodiments include a computer readable medium having computer readable code thereon for providing network redundancy and high availability to remote network nodes. The computer readable medium includes instructions for providing a first tunnel across a layer 3 network from a first network device to a second network device, the second network device a member of a cluster of network devices. The computer readable medium further includes instructions for providing a first virtual interface (VI) on the second network device, the first VI assigned to the first tunnel and passing information related to the first tunnel and the first VI to a third network device, the third network device a member of the cluster. Additionally the computer readable medium includes instructions for providing a second tunnel across a layer 3 network from the third device to the first network device and providing a second virtual interface (VI) on the third network device, the second VI assigned to the second tunnel. The computer readable medium also includes instructions for exchanging forwarding information learned on the first VI to the third network device and exchanging forwarding information learned on the second VI to the second network device.

Still other embodiments include a computerized device (e.g., a network element), configured to process all the method operations disclosed herein as embodiments of the invention. In such embodiments, the computerized device includes a memory system, a processor, communications interface in an interconnection mechanism connecting these components. The memory system is encoded with a process that provides network redundancy and high availability to remote network nodes as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing network redundancy and high availability to remote network nodes as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
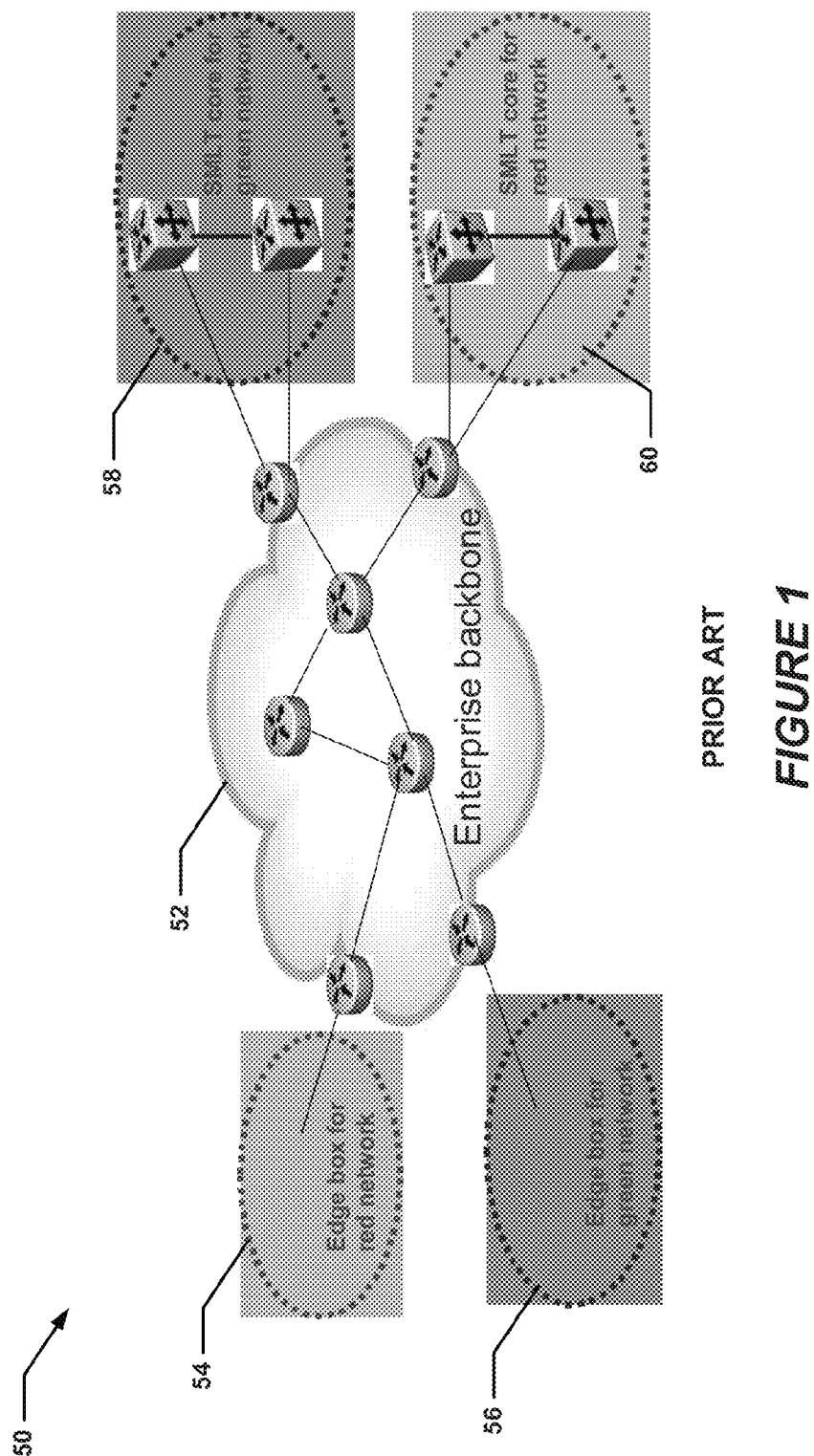
FIG. 1 illustrates a conventional network environment having multiple SMLT configurations.

Referring to FIG. 1, a conventional network environment 50 is shown. Environment 50 includes an enterprise backbone 52. An edge network device 54 interconnects with a SMLT core network 60 across enterprise backbone 52. Similarly, edge network device 56 interconnects with a SMLT core network 58 across enterprise backbone 52.

Figure 2:
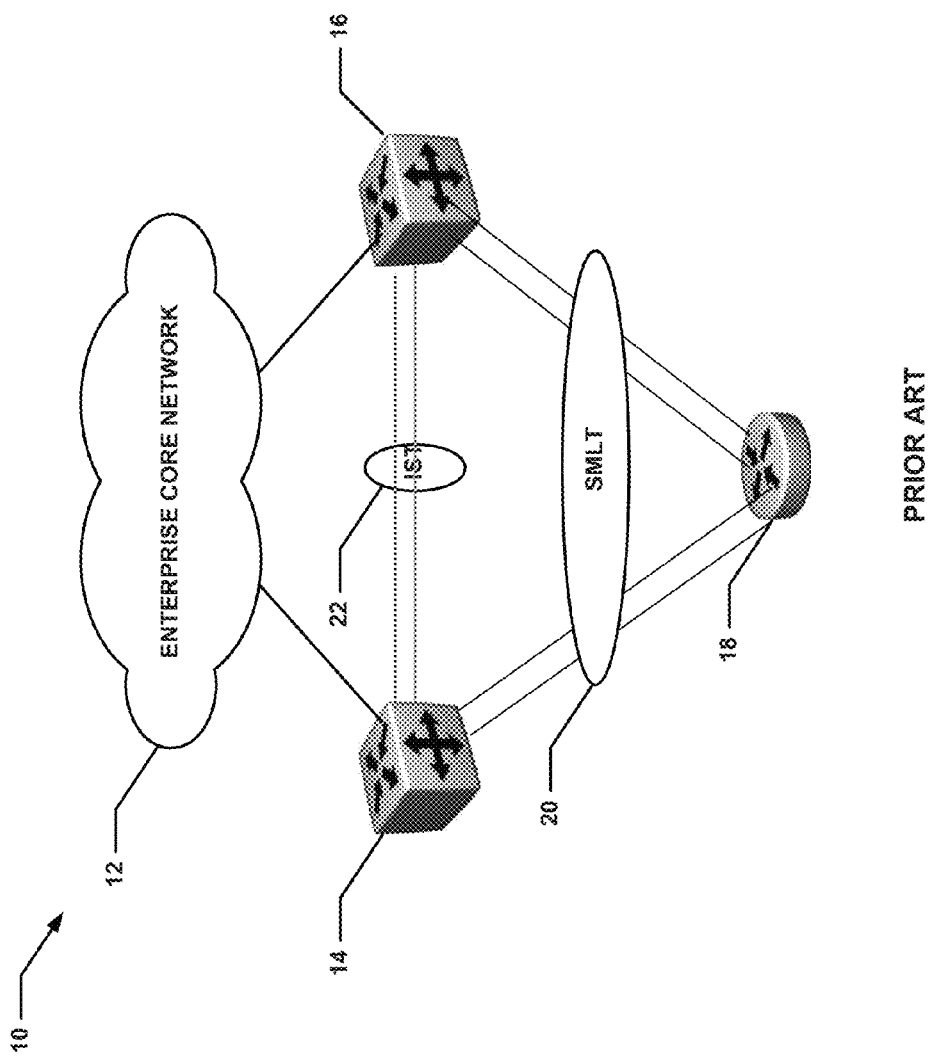
FIG. 2 illustrates a conventional SMLT configuration.

Referring now to FIG. 2, a conventional basic RSMLT network environment 10 is shown. Network elements 14, 16 and 18 are connected to each other via a Split Multi-Link Trunk (SMLT) 20 which provides for extra bandwidth as well as redundancy. The network elements 14 and 16 are configured to run Layer 3 protocols (IPv4 family in particular) as well as an additional proprietary protocol via which they exchange information about their configuration, state, databases and link state. This latter protocol runs over the Inter-Switch Trunk (IST) 22 connection between the two peers that form the RSMLT peers. Network element 14 and 16 are peers for each other and part of a cluster. One side the cluster is connected to the network core 12 and on the other side each peer is connected via SMLT 20 to the network element 18 which is running as a Layer 2 switch and is unaware of the fact that it is connecting to two distinct systems. The network element 18 performs the load-sharing function when forwarding traffic over the SMLT links which is flowing towards the network core 12. The two RSMLT peers 14 and 16 in the cluster install each other's MAC addresses, ARP, IPv4 interface addresses, Access Tunnel assignments, Mobility VLAN associations and Access Point information in their own respective tables, thus making themselves capable of routing traffic destined for their peer, that due to the load-sharing function of the access switch could end up on themselves. By routing the traffic themselves as if the intended recipient, the packets avoid taking an extra hop through the network thus keeping the latency low while providing redundancy.

Conventional SMLT/RSMLT links are limited to the physical interface level. SMLT/RSMLT failover events, such as SMLT link up or link down, are triggered by physical interface or I/O port status changes. Current SMLT/RSMLT solutions require that all the SMLT links be pre-configured, in other words dynamic SMLT links are not supported. The number of SMLT/RSMLT links is limited by either the number of MLTs (SMLT case) or the number of physical ports (SLT case). Accordingly, conventional SMLT/RSMLT can only be deployed at certain portions of a network, and cannot cross a cloud network.

Figure 3:
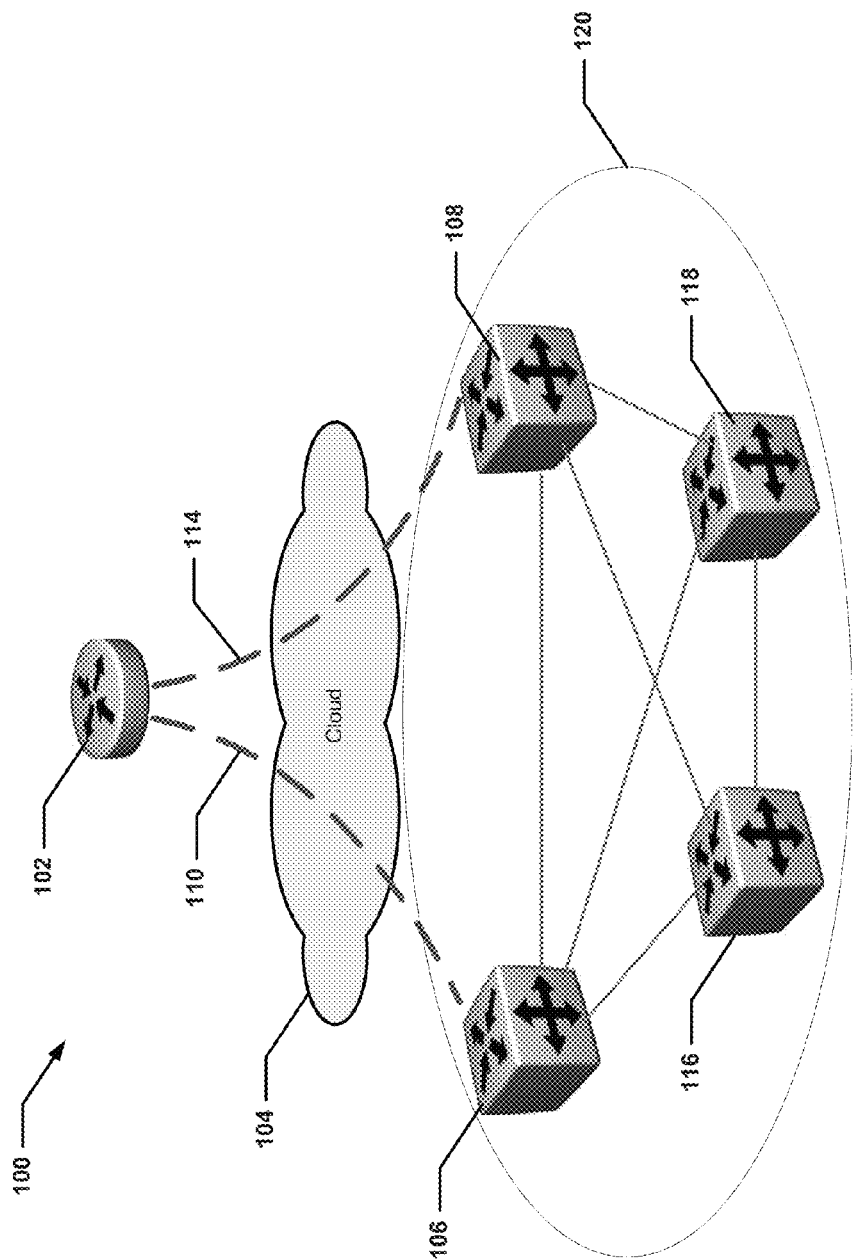
FIG. 3 illustrates a network environment having a cluster in communication with a network element across a layer 3 network in accordance with embodiments of the invention.

Referring now to FIG. 3, a network environment 100 is shown wherein network redundancy and high availability is provided to remote nodes over a layer 3 network. A first network element 102 is in communication with a second network element 106 through a layer 3 network (cloud 104) by way of a network tunnel 110. Similarly, first network element 102 is in communication with a third network element 108 through the layer 3 network (cloud 104) by way of network tunnel 114. Network elements 106 and 108 are part of a cluster 120, which also includes network elements 116 and 118.

The presently described method for providing network redundancy and high availability to remote nodes performing provides three basic services. These include the existing SMLT/RSMLT solution, virtual (logical) interfaces, and Dynamic Network Tunnels that are built on top of virtual interfaces.

The existing SMLT/RSMLT solution has been described in detail above. Virtual interfaces, also called logical interfaces, are network IO entities, which reside between the physical layer (layer 1) and Data Link layer (layer 2) in OSI network reference model. Just like physical interfaces, virtual interfaces can receive and send network traffic in and out switch/routing devices. From upper layer protocols' perspective, there is no difference between physical and virtual interfaces. However, different from physical interfaces, which are built on hardware, virtual interfaces are created and deleted dynamically based on system or protocol request. The way that logical/virtual interfaces are generated and managed may vary from system to system. The present invention hides the difference between physical interfaces and virtual interfaces from upper layer protocols, so that protocol modules can handle both types of interfaces in the same fashion.

Although virtual interfaces send/receive network traffic through physical interfaces, they may not have fixed association to physical interfaces. Their mapping is managed by network protocols, such as TCP/IP, that control network tunnels over virtual interfaces. The physical to virtual interface mapping can change dynamically at run time.

Virtual interfaces share many characteristics with physical interfaces. For example, just like physical interfaces, virtual interfaces can go up and down, which is normally achieved by some kind of tunnel signaling mechanisms. From the upper layer protocol's perspective, a virtual interface and a physical interface behave the same way, thus there is no change needed for the upper layer protocol to support the virtual interface. I/O takes place through the physical interfaces, wherein the virtual interfaces are mapped to the physical interfaces. The virtual interfaces can be created and deleted dynamically base don system or protocol requests. The virtual interfaces share many characteristics with physical interfaces, such as link up or down, tagged or untagged, and the like.

Point-to-point connections, normally called network tunnels, can be built on top of virtual interfaces. Data packets are encapsulated at one end of the tunnel, and decapsulated at the other end of the tunnel. Applications may utilize different approaches to set up network connections. Many of these types of connections are created by signaling protocols, and are session based. The network tunnel is normally built up first, and then a virtual interface is created and assigned to that tunnel. From this point, the virtual interface is used to represent that network tunnel. The tunnel status, such link Up and Down, is indicated by virtual interface link states. This way upper layer protocols can manage these network tunnels in the same fashion as managing regular physical interfaces. In order to provide redundancy on such remote network tunnels, SMLT/RSMLT can be built on the virtual interfaces, on which network tunnels are created. This normally requires "peer SMLT/RSMLT tunnel" are dynamically generated once such network tunnel is built. These two SMLT/RSMLT tunnels back up each to grant redundancy.

Figure 4:
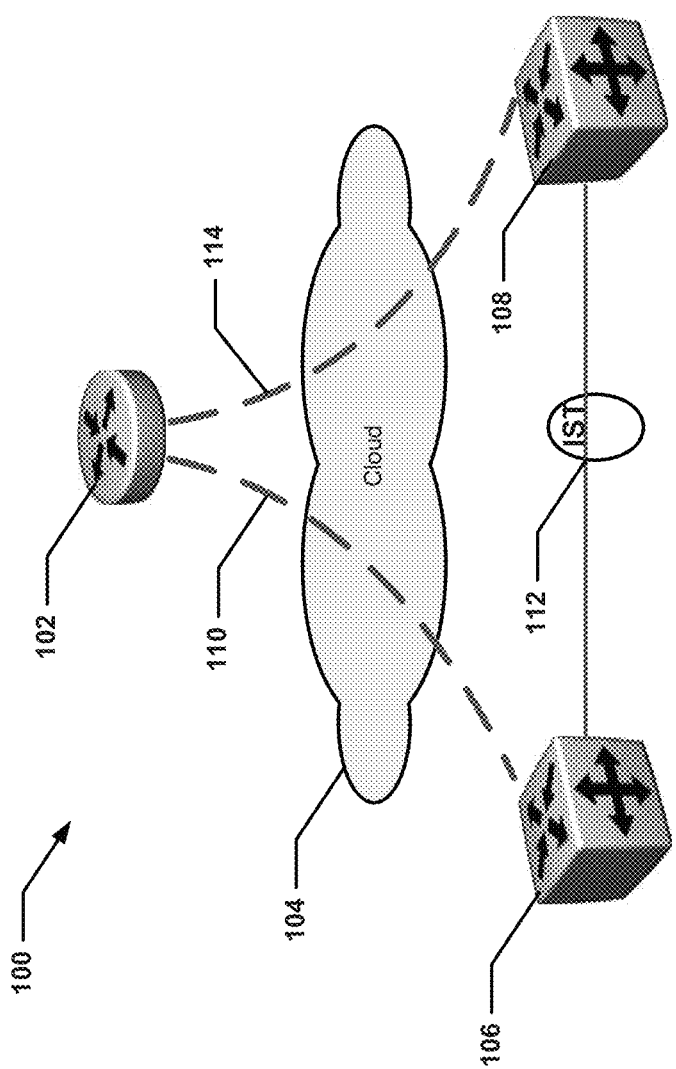
FIG. 4 illustrates a network environment having a two element cluster in an SMLT configuration in communication with a network element across a layer 3 network in accordance with embodiments of the invention.

Referring now to FIG. 4, environment 100 is shown wherein the cluster is comprised of only two network elements 106 and 108 which are in communication with each other by way of IST 112. A network connection or tunnel 110 is built from network element 102 with first SMLT/RSMLT peer 106 across the layer 3 network (cloud 104), and a virtual interface is created to present this tunnel 110 on network element 106.

Some mechanism, such as passing messages to SMLT/RSMLT peer via IST 112, is used to trigger the creation of peer network tunnel 114 between second SMLT/RSMLT peer 108 across cloud 104 to network element 102. A virtual interface for tunnel 114 is also provided. This mechanism may vary from application to application. No matter what method an application takes, the peer tunnel 114 maintains all the information of primary network tunnel 110, so that they can back up each other. SMLT/RSMLT is enabled on the virtual interfaces on both SMLT peers 106 and 108. SMLT/RSMLT protocols can apply seamlessly on the virtual interfaces. For example, the forwarding information learned on virtual interfaces is synchronized between SMLT peers. Redundancy and load balancing can be provided automatically by the underneath SMLT/RSMLT technology.

The above SMLT/RSMLT peers may work in cluster mode, meaning they behave as a single network entity to the rest of network; or they can expose the two SMLT/RSMLT virtual interfaces to other network nodes, then other network devices will treat them as two network entities.

In the event that the RSMLT cluster element 108 fails at some point or is taken off service for a period of time, the active cluster peer 106 keeps forwarding the data traffic on its behalf. This is accomplished by network element 106 continuing for a time to assume the identity of the inactive network element 108 and recognizing the inactive switch's addresses as its own. The switchover in the case of failure is as immediate as the network element 102 can recognize the fact that its connections to that member of the RSMLT cluster are lost and redirects all incoming traffic to the active member 106, which usually is in the order of milliseconds. Data traffic thus continues to flow unabated in either direction.

Figure 5:
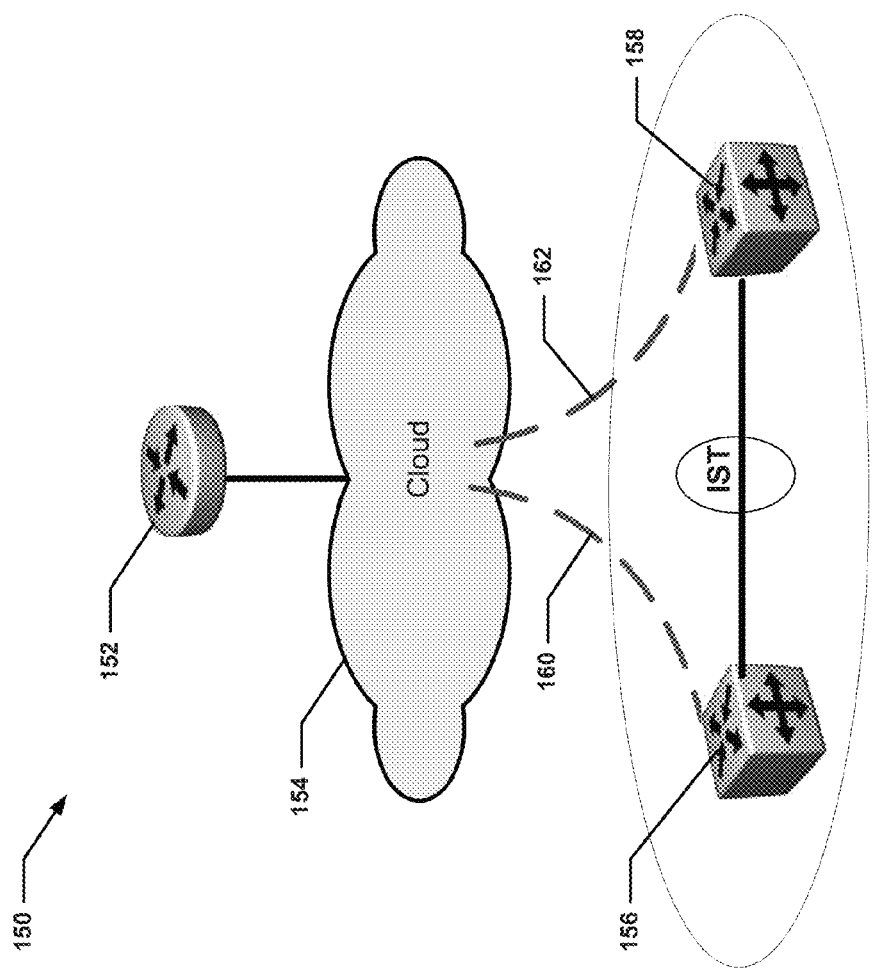
FIG. 5 illustrates a network environment having a two element cluster in an SMLT configuration arranged in a master/slave configuration in communication with a network element across a layer 3 network in accordance with embodiments of the invention.

Referring now to FIG. 5, an environment 150 is shown wherein RSMLT/SMLT peers 156 and 158 work in cluster mode, meaning they behave as a single network entity to the rest of network. In this embodiment, the two virtual interfaces on SMLT/RSMLT peers may either work in master and standby mode. Only the master virtual interface is exposed to the rest of network, so that other network devices can create a single connection to the SMLT/RSMLT peers. The standby virtual interface won't take master rule until master virtual interface goes down. However, because standby virtual interface maintains all master's tunnel information, both of them are capable of processing data packets. This way load balancing can be achieved. As an example of this method, TCP based applications can take advantage of this approach. The two virtual interfaces on SMLT/RSMLT peers can simply be programmed with the same Virtual IP address. Other network devices can just build tunnel to that Virtual IP address. Therefore a tunnel from network element 152 extends to both peer 156 and peer 158 by way of tunnels 160 and 162 respectively.

Figure 6:
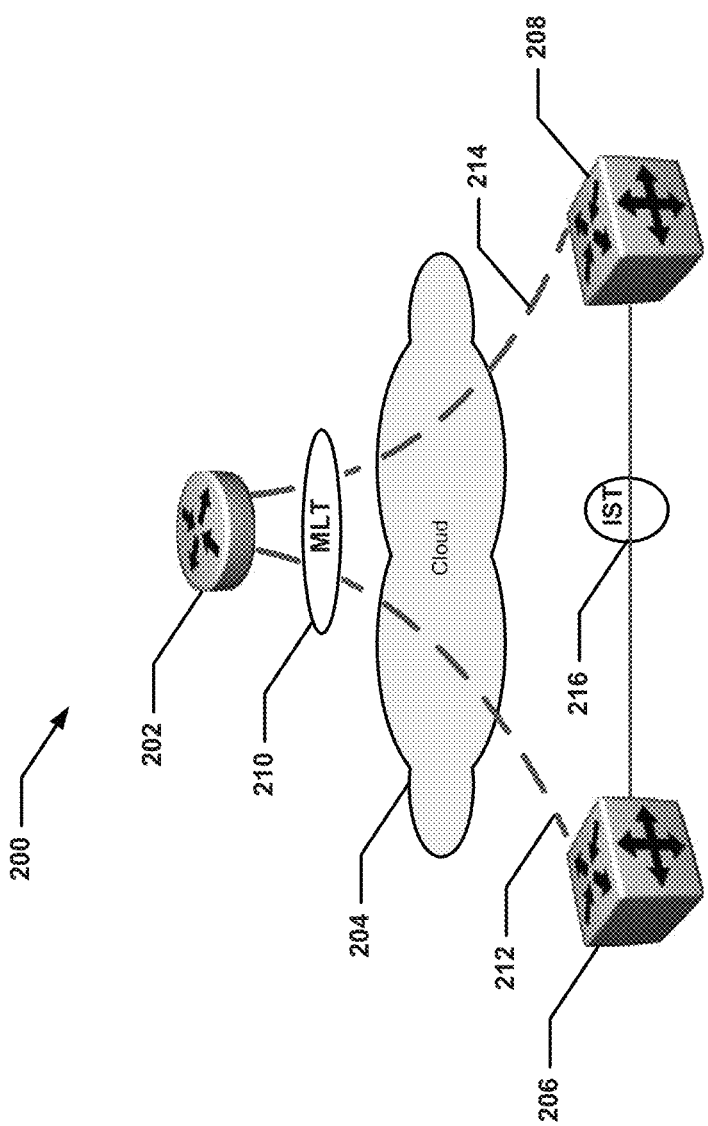
FIG. 6 illustrates a network environment having a two element cluster in an SMLT configuration arranged in a peer configuration in communication with a network element across a layer 3 network in accordance with embodiments of the invention.

Referring now to FIG. 6, an environment 200 is shown wherein RSMLT/SMLT peers 206 and 208 wherein both virtual interfaces on SMLT/RSMLT peers are visible to the rest of network. Other network nodes may build tunnels 212, 214 to both virtual interfaces. However, these two tunnels are treated as equivalent connections so that load balancing and redundancy can be built between these two tunnels. A simple way to achieve this is to treat these two connections as members of an MLT link 210.

Figure 7A:
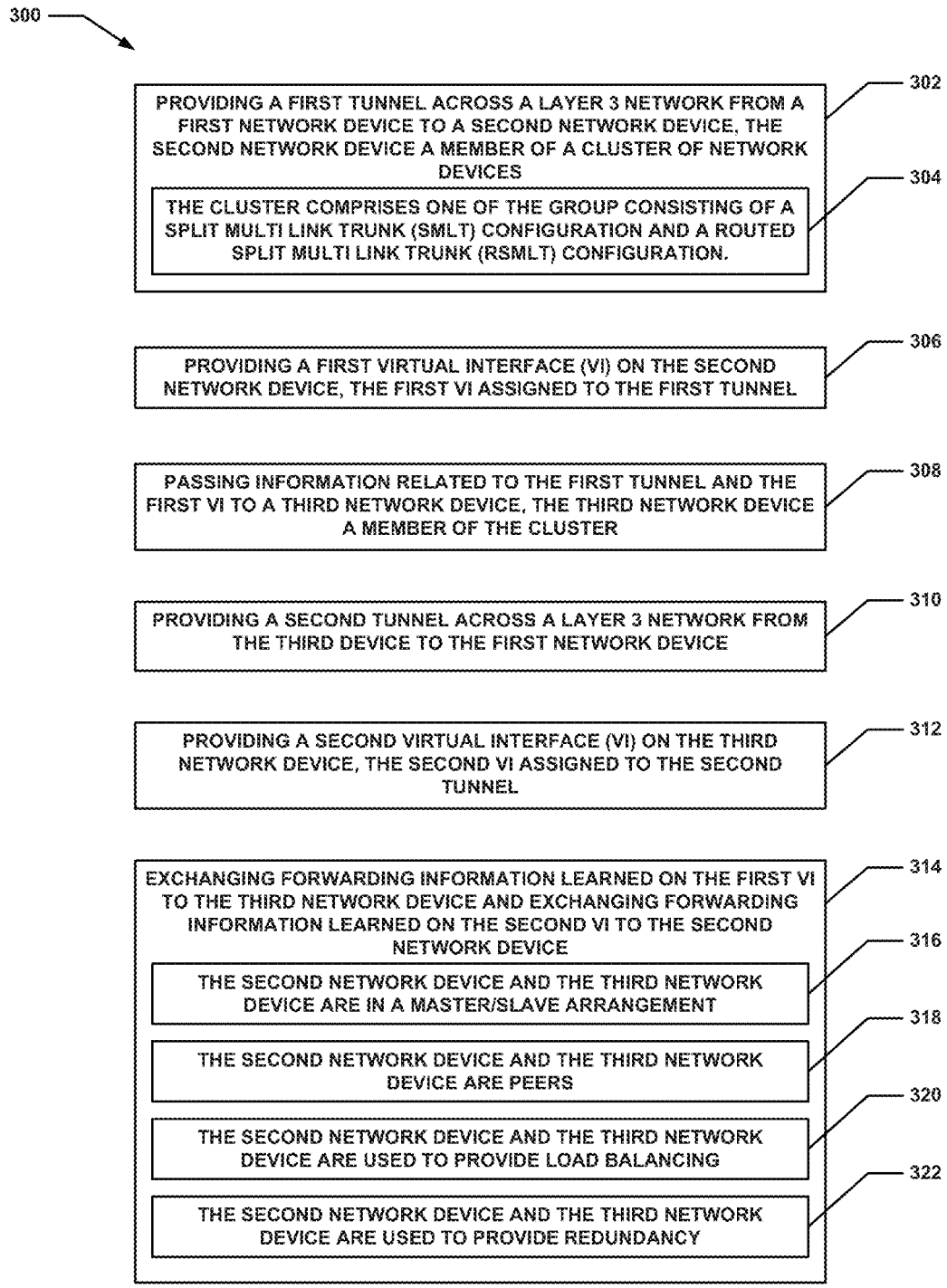
FIG. 7 depicts a flow diagram of a particular embodiment of a method of providing network redundancy and high availability to remote network nodes in accordance with the present invention.
Figure 7B:
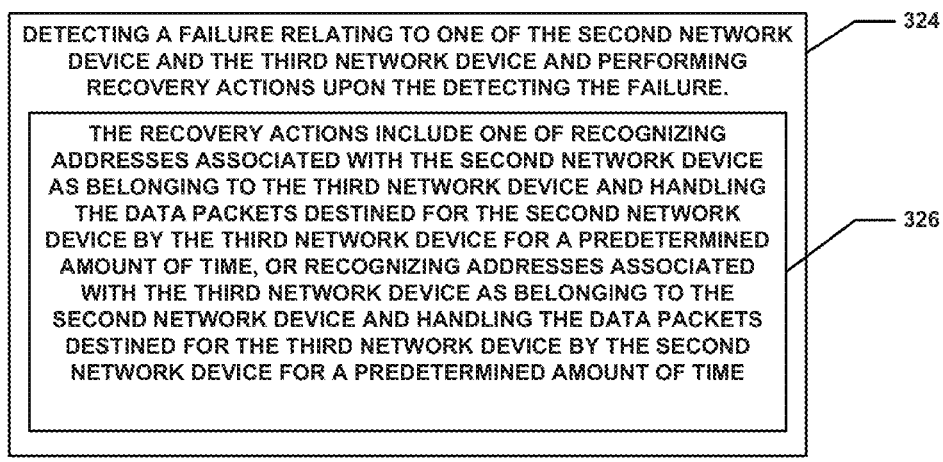

Referring now to FIGS. 7A and 7B a flow diagram of a particular embodiment of the presently disclosed method is depicted. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Method 300 of FIGS. 7A and 7B begins with processing block 302 which discloses providing a first tunnel across a layer 3 network from a first network device to a second network device, said second network device a member of a cluster of network devices. The layer 3 network may be realized as a cloud. Processing block 302 states the cluster comprises one of the group consisting of a Split Multi Link Trunk (SMLT) configuration and a Routed Split Multi Link trunk (RSMLT) configuration.

Processing block 306 recites providing a first virtual interface (VI) on the second network device, the first VI assigned to the first tunnel. Virtual interfaces, also called logical interfaces, are network I/O entities, which reside between the physical layer (layer 1) and Data Link layer (layer 2) in OSI network reference model. Just like physical interfaces, virtual interfaces can receive and send network traffic in and out switch/routing devices. From upper layer protocols' perspective, there is no difference between physical and virtual interfaces. However, different from physical interfaces, which are built on hardware, virtual interfaces are created and deleted dynamically based on system or protocol request.

Processing block 308 discloses passing information about the first tunnel and the first VI to a third network device, the third network device a member of the cluster. Logical connections between the cluster nodes are referred to as Inter-Switch Trunks (ISTs). ISTs may be physical links that extend from one network element to a neighboring network element in the cluster, or may be logical links that tunnel through one or more intermediate network elements within the cluster.

Processing block 310 states providing a second tunnel across a layer 3 network from the third device to the first network device. Processing block 312 recites providing a second virtual interface (VI) on the third network device, the second VI assigned to the second tunnel.

Processing continues with processing block 314 which discloses exchanging forwarding information learned on the first VI to the third network device and exchanging forwarding information learned on the second VI to the second network device. In one embodiment, as described in processing block 316, the second network device and the third network device are in a master/slave arrangement where the second network device and the third network device behave as a single network entity to the rest of network. The virtual interface on the second device and on the third network device may share a same virtual IP address such that a tunnel from the first network device connects to both the second network device and the third network device. In another embodiment, as described in processing block 318, the second network device and the third network device are peers where the second network device and the third network device are visible to the rest of network. In this configuration, the virtual interface on the second network device has a different IP address than the virtual interface on the third network device.

In a particular embodiment, as shown in processing block 320, the second network device and the third network device are used to provide load balancing wherein the first tunnel and the second tunnel are treated as equivalent connections. As also shown in processing block 322 the second network device and the third network device are used to provide redundancy wherein the first tunnel and the second tunnel are treated as equivalent connections.

Processing block 324 states detecting a failure relating to one of the second network device and the third network device and performing recovery actions upon the detecting the failure. Processing block 326 recites wherein the recovery actions include one of recognizing addresses associated with the second network device as belonging to the third network device and handling the data packets destined for the second network device by the third network device for a predetermined amount of time, or recognizing addresses associated with the third network device as belonging to the second network device and handling the data packets destined for the third network device by the second network device for a predetermined amount of time.

Figure 8:
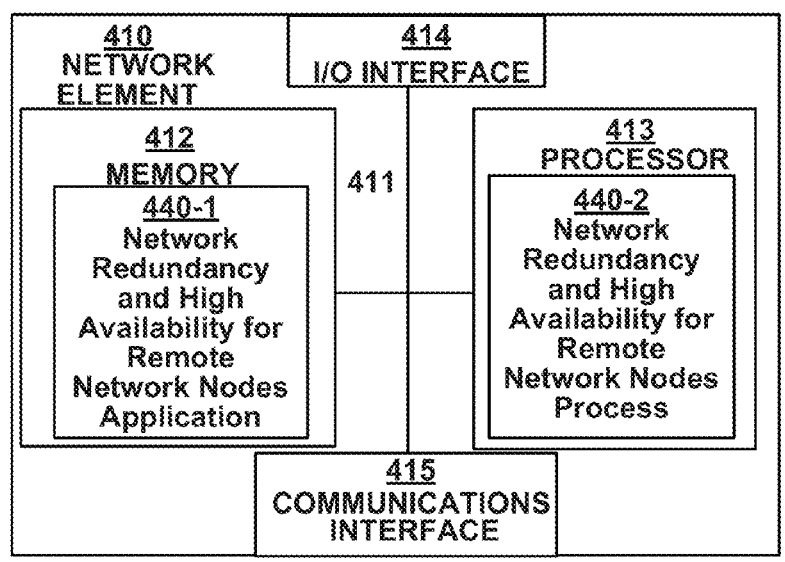
FIG. 8 illustrates an example computer system architecture for a network element that provides network redundancy and high availability to remote network nodes in accordance with embodiments of the invention.

FIG. 8 is a block diagram 400 illustrating example architecture of a computer system (network element) 410 that executes, runs, interprets, operates or otherwise performs network redundancy and high availability for remote network nodes operating application 440-1 and network redundancy and high availability for remote network nodes operating process 440-2 suitable for use in explaining example configurations disclosed herein. The computer system 410 may be any type of computerized device such as a personal computer, workstation, portable computing device, console, laptop, network terminal or the like. As shown in this example, the computer system 410 includes an interconnection mechanism 411 such as a data bus or other circuitry that couples a memory system 412, a processor 413, an input/output interface 414, and a communications interface 415. The communications interface 415 enables the computer system 410 to communicate with other devices (i.e., other computers) on a network (not shown).

The memory system 412 is any type of computer readable medium, and in this example, is encoded with a network redundancy and high availability for remote network nodes operating application 440-1 as explained herein. The network redundancy and high availability for remote network nodes operating application 440-1 may be embodied as software code such as data and/or logic instructions (e.g., code stored in the memory or on another computer readable medium such as a removable disk) that supports processing functionality according to different embodiments described herein. During operation of the computer system 410, the processor 413 accesses the memory system 412 via the interconnect 411 in order to launch, run, execute, interpret or otherwise perform the logic instructions of a network redundancy and high availability for remote network nodes operating application 440-1. Execution of a network redundancy and high availability for remote network nodes operating application 440-1 in this manner produces processing functionality in the network redundancy and high availability for remote network nodes operating process 440-2. In other words, the network redundancy and high availability for remote network nodes operating process 440-2 represents one or more portions or runtime instances of a network redundancy and high availability for remote network nodes operating application 440-1 (or the entire a network redundancy and high availability for remote network nodes operating application 440-1) performing or executing within or upon the processor 413 in the computerized device 410 at runtime.

It is noted that example configurations disclosed herein include the network redundancy and high availability for remote network nodes operating application 440-1 itself (i.e., in the form of un-executed or non-performing logic instructions and/or data). The network redundancy and high availability for remote network nodes operating application 440-1 may be stored on a computer readable medium (such as a floppy disk), hard disk, electronic, magnetic, optical, or other computer readable medium. A network redundancy and high availability for remote network nodes operating application 440-1 may also be stored in a memory system 412 such as in firmware, read only memory (ROM), or, as in this example, as executable code in, for example, Random Access Memory (RAM). In addition to these embodiments, it should also be noted that other embodiments herein include the execution of a network redundancy and high availability for remote network nodes operating application 440-1 in the processor 413 as the network redundancy and high availability for remote network nodes operating process 440-2. Those skilled in the art will understand that the computer system 410 may include other processes and/or software and hardware components, such as an operating system not shown in this example.

During operation, processor 413 of computer system 410 accesses memory system 412 via the interconnect 411 in order to launch, run, execute, interpret or otherwise perform the logic instructions of the network redundancy and high availability for remote network nodes application 440-1. Execution of network redundancy and high availability for remote network nodes application 440-1 produces processing functionality in network redundancy and high availability for remote network nodes process 440-2. In other words, the network redundancy and high availability for remote network nodes process 440-2 represents one or more portions of the network redundancy and high availability for remote network nodes application 440-1 (or the entire application) performing within or upon the processor 413 in the computer system 410.

It should be noted that, in addition to the network redundancy and high availability for remote network nodes process 440-2, embodiments herein include the network redundancy and high availability for remote network nodes application 440-1 itself (i.e., the un-executed or non-performing logic instructions and/or data). The network redundancy and high availability for remote network nodes application 440-1 can be stored on a computer readable medium such as a floppy disk, hard disk, or optical medium. The network redundancy and high availability for remote network nodes application 440-1 can also be stored in a memory type system such as in firmware, read only memory (ROM), or, as in this example, as executable code within the memory system 412 (e.g., within Random Access Memory or RAM).

In addition to these embodiments, it should also be noted that other embodiments herein include the execution of network redundancy and high availability for remote network nodes application 440-1 in processor 413 as the network redundancy and high availability for remote network nodes process 440-2. Those skilled in the art will understand that the computer system 410 can include other processes and/or software and hardware components, such as an operating system that controls allocation and use of hardware resources associated with the computer system 410.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
providing a first tunnel across a layer 3 network from a first network device to a second network device, said second network device a member of a cluster of network devices;
providing a first virtual interface (VI) on said second network device, said first VI assigned to said first tunnel;
passing information related to said first tunnel and said first VI to a third network device, said third network device a member of said cluster;
providing a second tunnel across a layer 3 network from said third device to said first network device;
providing a second virtual interface (VI) on said third network device, said second VI assigned to said second tunnel;
exchanging forwarding information learned on said first VI to said third network device and exchanging forwarding information learned on said second VI to said second network device; and
wherein said first network device, said second network device and said third network device comprise network switches.

2. The method of claim 1 wherein said layer 2 network comprises a cloud network.

3. The method of claim 1 wherein said second network device and said third network device are in a master/slave arrangement where said second network device and said third network device behave as a single network entity to the rest of network.

4. The method of claim 1 wherein said second network device and said third network device are peers where said second network device and said third network device are visible to the rest of network.

5. The method of claim 1 wherein said second network device and said third network device are used to provide load balancing wherein said first tunnel and said second tunnel are treated as equivalent connections.

6. The method of claim 1 wherein said second network device and said third network device are used to provide redundancy wherein said first tunnel and said second tunnel are treated as equivalent connections.

7. The method of claim 1 further comprising detecting a failure relating to one of said second network device and said third network device and performing recovery actions upon said detecting said failure.

8. The method of claim 7 wherein said recovery actions include one of recognizing addresses associated with said second network device as belonging to said third network device and handling said data packets destined for said second network device by said third network device for a predetermined amount of time, or recognizing addresses and tunnels associated with said third network device as belonging to said second network device and handling said data packets destined for said third network device by said second network device for a predetermined amount of time.

9. A non-transitory computer readable storage medium having computer readable code thereon for method and apparatus providing network redundancy and high availability to remote network nodes, the medium including instructions in which a computer system performs operations comprising:
providing a first tunnel across a layer 3 network from a first network device to a second network device, said second network device a member of a cluster of network devices;
providing a first virtual interface (VI) on said second network device, said first VI assigned to said first tunnel;
passing information related to said first tunnel and said first VI to a third network device, said third network device a member of said cluster;
providing a second tunnel across a layer 3 network from said third device to said first network device;
providing a second virtual interface (VI) on said third network device, said second VI assigned to said second tunnel;
exchanging forwarding information learned on said first VI to said third network device and exchanging forwarding information learned on said second VI to said second network device; and
wherein said first network device, said second network device and said third network device comprise network switches.

10. The computer readable storage medium of claim 9 wherein said layer 2 network comprises a cloud network.

11. The computer readable storage medium of claim 9 wherein said second network device and said third network device are in a master/slave arrangement where said second network device and said third network device behave as a single network entity to the rest of network.

12. The computer readable storage medium of claim 9 wherein said second network device and said third network device are peers where said second network device and said third network device are visible to the rest of network.

13. The computer readable storage medium of claim 9 wherein said second network device and said third network device are used to provide load balancing wherein said first tunnel and said second tunnel are treated as equivalent connections.

14. The computer readable storage medium of claim 9 wherein said second network device and said third network device are used to provide redundancy wherein said first tunnel and said second tunnel are treated as equivalent connections.

15. The computer readable storage medium of claim 9 further comprising instructions for detecting a failure relating to one of said second network device and said third network device and performing recovery actions upon said detecting said failure.

16. The computer readable storage medium of claim 15 wherein said recovery actions include one of recognizing addresses associated with said second network device as belonging to said third network device and handling said data packets destined for said second network device by said third network device for a predetermined amount of time, or recognizing addresses associated with said third network device as belonging to said second network device and handling said data packets destined for said third network device by said second network device for a predetermined amount of time.

17. A computer system comprising:
a memory;
a processor;
a communications interface;
an interconnection mechanism coupling the memory, the processor and the communications interface; and
wherein the memory is encoded with an application providing network redundancy and high availability to remote network nodes, that when performed on the processor, provides a process for processing information, the process causing the computer system to perform the operations of:
providing a first tunnel across a layer 3 network from a first network device to said computer system, said computer system a member of a cluster of network devices;
providing a first virtual interface (VI) on said computer system, said first VI assigned to said first tunnel;
passing information related to said first tunnel and said first VI to a peer network device, said peer network device a member of said cluster;
providing a second tunnel across a layer 3 network from said peer network device to said first network device;
providing a second virtual interface (VI) on said peer network device, said second VI assigned to said second tunnel;
exchanging forwarding information learned on said first VI to said peer network device and exchanging forwarding information learned on said second VI to said computer system: and
wherein said first network device, said second network device and said third network device comprise network switches.

18. The computer system of claim 17 wherein said layer 2 network comprises a cloud network.

19. The computer system of claim 17 wherein said computer system and said peer network device are in one of the group comprising a master/slave arrangement where said computer system and said peer network device behave as a single network entity to the rest of network or wherein said computer system and said peer network device are peers where said computer system and said peer network device are visible to the rest of said network.

20. The computer system of claim 17 wherein said computer system detects a failure relating to a peer network device and performs recovery actions upon said detecting said failure, wherein said recovery actions include recognizing addresses associated with said peer network device as belonging to said computer system and handling data packets destined for said peer network device by said computer system for a predetermined amount of time.

* * * * *